United States Patent [19]
Place

[11] 3,908,842
[45] Sept. 30, 1975

[54] TOW TRUCK

[76] Inventor: William Place, 8 Tower Road, Lexington, Mass. 02173

[22] Filed: May 18, 1973

[21] Appl. No.: 361,803

[52] U.S. Cl. ............... 214/86 A; 298/22 J; 254/8 R
[51] Int. Cl.² .......................................... B60P 3/12
[58] Field of Search .......... 214/86 A, 505; 254/124, 254/8 R, 8 B, 8 C; 212/55; 280/402; 298/22 R, 22 J, 22 D, 19 R

[56] References Cited
UNITED STATES PATENTS

| | | | |
|---|---|---|---|
| 2,621,814 | 12/1952 | Lisota | 214/505 |
| 2,644,595 | 7/1953 | Levan | 214/86 A |
| 2,878,057 | 3/1959 | Godbersen | 298/22 J |
| 2,951,601 | 9/1960 | Castoe | 214/86 A |
| 3,716,152 | 2/1973 | Sloter | 214/86 A |
| 3,722,154 | 3/1973 | Sakamoto | 212/55 X |

*Primary Examiner*—Albert J. Makay
*Attorney, Agent, or Firm*—Arthur Z. Bookstein

[57] ABSTRACT

A tow truck has a telescopically collapsible boom which can be telescoped and retracted into the flatbed of the truck to permit the truck to be used for other purposes. The boom is raised and lowered by an improved hydraulic jack arrangement which distributes the load of the towed vehicle more effectively between the front and the rear wheels for improved stability and load carrying capacity. When in a lowered, retracted position the boom can support the usual towing straps and tow bar in a manner which enables the tow truck to be backed toward the vehicle in a wedging action to provide improved access to the frame of that vehicle to facilitate the attachment of the towing hooks to the frame.

8 Claims, 9 Drawing Figures

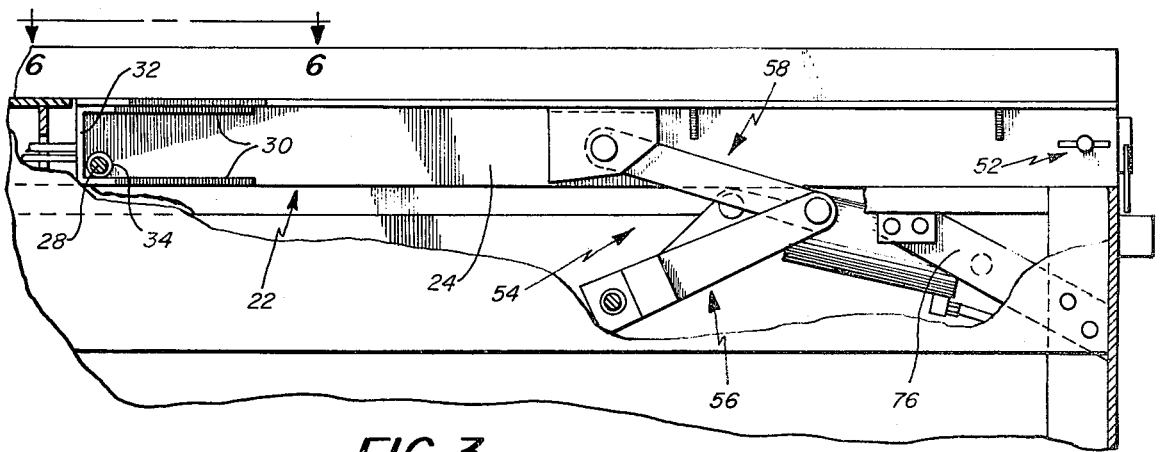
FIG. 3
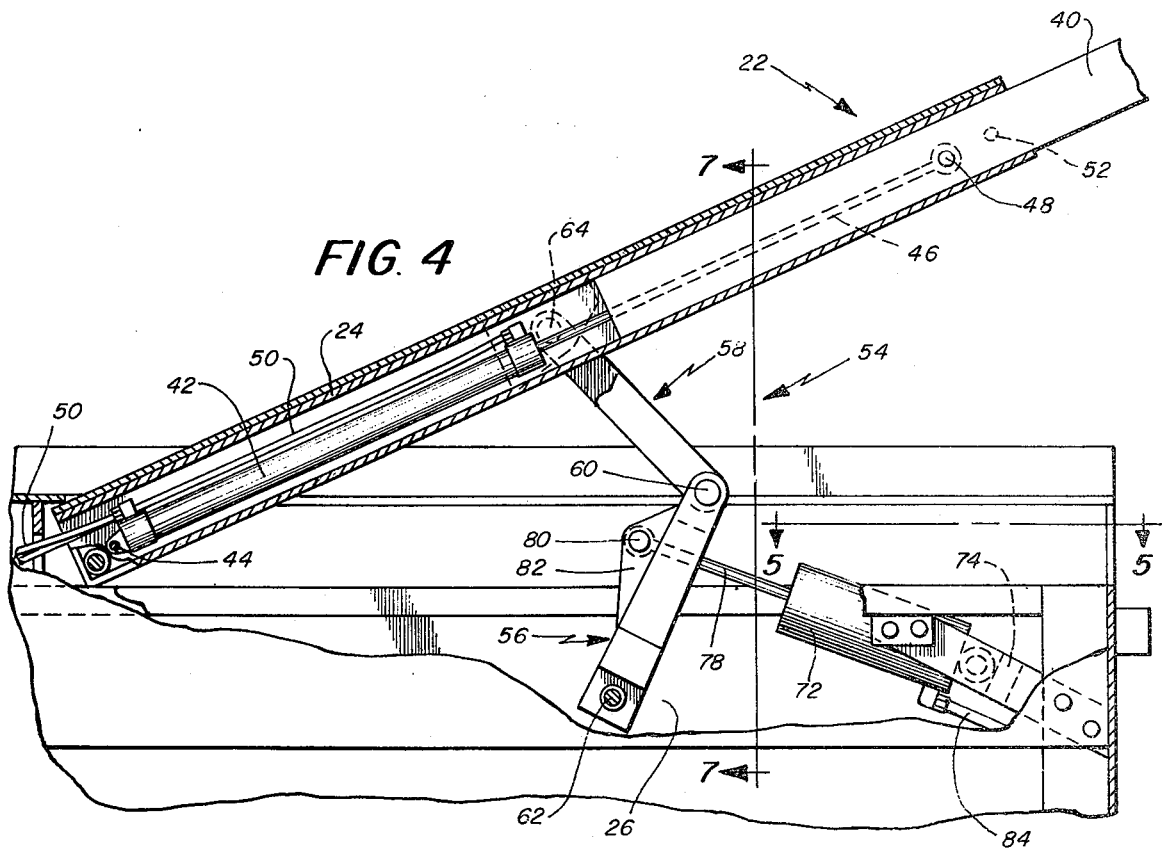
FIG. 4
FIG. 5
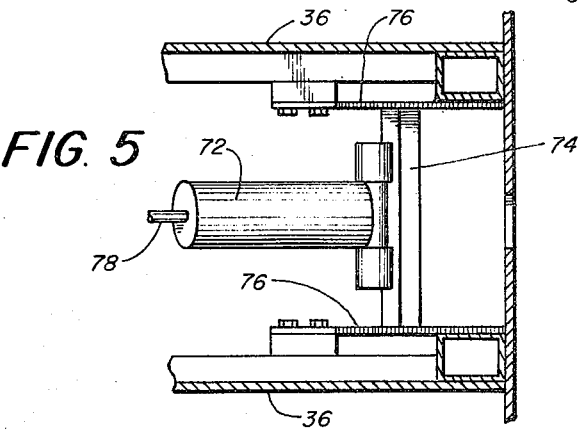

TOW TRUCK

BACKGROUND OF THE INVENTION

While the desirability of employing a multiple purpose flatbed and tow truck has been proposed (such as in U.S. Pat. Nos. 2,644,595 and 2,951,601) a successful, commercially acceptable vehicle of this type has not yet been achieved. This appears to result from the fact that the prior proposed combination trucks have required certain compromises to be made which detracted from the utility of the truck when used either in its towing or flatbed mode. These compromises generally result from space limitations imposed on the towing and/or hoisting mechanisms so that they may be retractable fully into the truck. For example, typical among the problems of the prior combination trucks is that the mechanism for raising the boom to the vehicle towing position is inefficient in that it has provided poor weight distribution. In the prior devices, the space limitations and restrictions required lifting mechanisms which transfer a substantial portion of the load of the towed vehicle behind the rear axle of the truck. This tends to lift the front wheels of the truck and severly limits the stability and load carrying ability of the truck. Also among the difficulties presented by prior combination trucks as well as conventional single purpose tow trucks is the attachment of the towing hooks to vehicles which have low front ends such as in the case of a wrecked car with broken front axles or a car with a very low suspension. The attachment of the towing hooks to such vehicles typically has required the truck operator to crawl under the narrow space between the front end of the vehicle and the road to attach the towing hook or hooks to the frame. This can be both time consuming and awkward. In some instances where the frame of the vehicle is so low to the ground that it cannot be reached, other supplementary means such as jacks and blocks must be employed to raise the front end of the vehicle to provide sufficient clearance for the operator to reach the vehicle frame. It is among the primary objects of my invention to provide an improved tow truck which avoids the foregoing problems yet which is retractable fully into the bed of the truck to permit multiple purpose use.

SUMMARY OF THE INVENTION

The truck includes a telescopic boom which is pivoted, at its forward end, to the frame and in a well which is below the flatbed of the truck. A cover plate is attached to the upper surface of the boom so that when the boom is fully retracted the cover plate will lie in the same plane as the bed to define a substantially flat surface. The boom includes a main pivoted portion and a rearwardly extending inner slidable portion which, at its outer end, supports the conventional towing strap and tow bar arrangement. The boom is raised and lowered by a scissors jack mounted in the well portion of the frame between the front and rear axles of the truck. The scissors jack and hydraulic cylinder which powers it are arranged in a manner in which a relatively negligable part of the load imposed by the towed vehicle is supported rearwardly of the rear axle and where the great proportion of the load is between the front and rear wheels. When access to the frame at the underside of the car is easy, the tow hooks, which are attached to the tow bar arrangement, can be attached in the usual manner, while the boom is in a lowered position. After the hooks have been attached the scissors jack mechanism is raised to raise the boom and the vehicle. When the front end of the car is too close to the road surface to permit easy access to the frame, the boom can be retracted and lowered to orient the towing straps in a rearwardly and downwardly inclined wedge-like attitude to permit the tow truck to be backed toward the front end of the vehicle. The tow straps engage the front end of the vehicle and can act to lift it thus providing access to the underside of the car to permit the truck operator to attach the towing hooks. After the hooks have been attached the boom can be raised and extended to the towing position. Unlike prior tow trucks, there are no winches, cables or the like.

It is among the primary objects of the invention to provide an improved tow truck having a boom which is retractable into the bed of the truck to define a substantially flatbed and permit the vehicle to be used for other purposes.

A further object of the invention is to provide a combination truck of the type described which provides improved stability and weight distribution of the load when in the towing mode.

A further object of the invention is to provide a truck of the type described which has a substantially higher load carrying capacity then prior combination trucks.

Still another object of the invention is to provide a tow truck with a raisable, extendable boom with an improved means for raising the boom.

Still another object of the invention is to provide a tow truck and towing mechanism which facilitates the attachment of the towing hooks to the frame of a vehicle in which the front end is unusually low to the ground.

A further object of the invention is to provide an improved towing mechanism which enables the front end of the vehicle to be lifted preliminarily to provide an improved access to the underside of the vehicle frame.

Still another object of the invention is to provide an improved combination flatbed and tow truck which avoids the compromises heretofor inherent in such combination trucks.

DESCRIPTION OF THE DRAWINGS

The foregoing and other objects and advantages of the invention will be understood more fully from the following detailed description thereof, with reference to the accompanying drawings wherein:

FIG. 3 is a side elevation of the rear of the truck, partly broken away, showing the boom lifting mechanism and boom in the retracted position;

FIG. 4 is an illustration similar to that of FIG. 3 showing the boom in the raised, extended position;

FIG. 5 is a top view of the hydraulic cylinder for raising the boom as seen along the line 5—5 of FIG. 4;

DESCRIPTION OF THE PREFERRED EMBODIMENT

Figure 1:
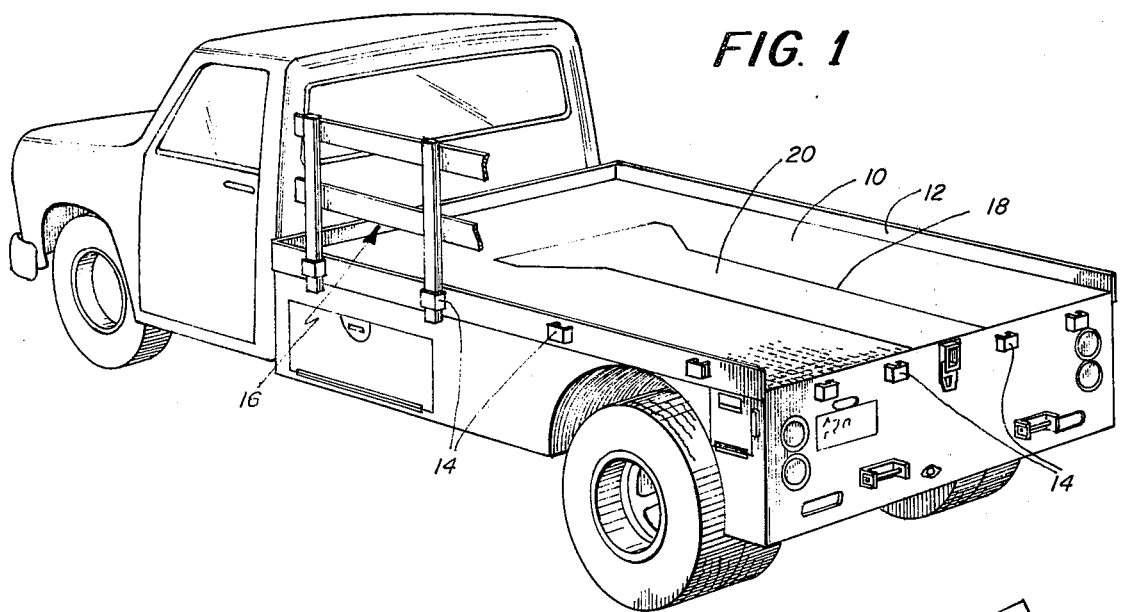
FIG. 1 is an illustration of the combination truck in the flatbed mode as seen from the left rear quarter of the truck.
Figure 2:
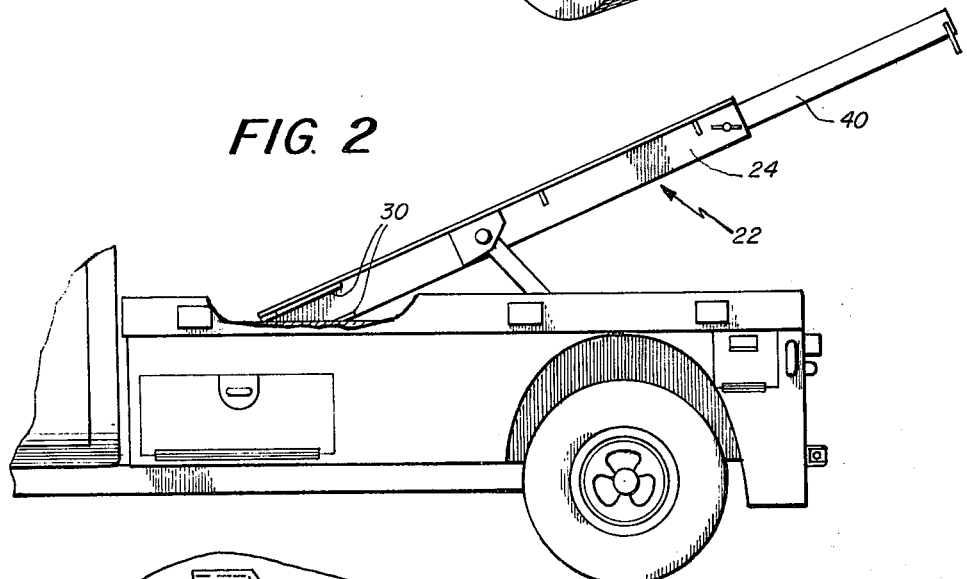
FIG. 2 is a side elevation of the rear portion of the truck, partly broken away, and showing the boom in a near fully raised extended position.
Figure 6:
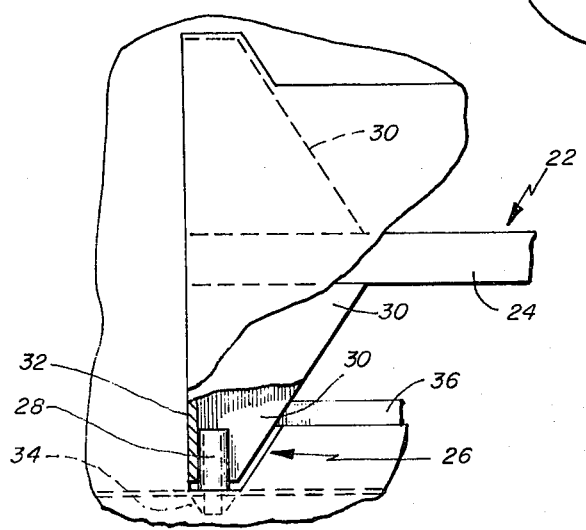
FIG. 6 is a top view of the forward, pivoted end of the boom as seen along the line 6—6 of FIG. 3.

As shown in FIG. 1 the rear portion of the truck includes a flat bed 10 which may be surrounded by a rail 12 which has brackets 14 mounted about its periphery to removably receive sideboards 16. The bed 10 includes a cutout region 18 which extends rearwardly along the bed 10 to its rearward end. The cutout 18 of the bed 10 receives a cover plate 20 which lies in the same plane as the bed 10. The cover plate 20 covers the well (described below) which houses the retractable boom. As described below, the plate 20 is secured to a portion of the boom and is raised and lowered in unison with it.

As seen in FIGS. 2-4 and 6 the boom indicated generally the reference character 22 includes an outer tubular section 24 which is pivoted at its forward end to a portion of the frame 26 at the pivot pins 28. The pivotal connection includes upper and lower gusset plates secured to the forward end of the outer boom member 24 and which are joined to the member 24 and to each other by a front plate 32. The member 24, gusset plates 30 and front plate 32 are secured, at their lateral extremities to the pivot pins 28 which, in turn, are suitably journaled to the frame 26 as suggested by the bearing 34 in FIG. 6. It should be noted that the bearings 34 are formed in a vertical portion of the frame 26 at a level below that of the bed 10. That portion of the frame extends rearwardly from the pivot connection and below the bed 10 to define vertical sidewalls 36 on opposite sides of the boom 22 to form a well 38 (see FIG. 7) which receives the retracted boom and boom raising mechanism.

The outer boom section slidably receives a tubular boom extension 40 and which may be telescopically extended or retracted by an hydraulic cylinder 42 mounted within the forward end of the outer boom section 24. The hydraulic cylinder 42 is pivoted at 44 to the sidewalls of the outer boom section 24 and has a rearwardly extending piston rod 46 which is connected to the boom extension 40 at the pin 48. The hydraulic cylinder 42 is supported within the boom so that when the boom extension 40 is telescopically retracted, it may pass over and surround the cylinder 42 which is then embraced in the hollow of the boom extension 40. The cylinder 42 may be operated by conventional valving arrangements which control the flow of hydraulic fluid to and from the cylinder as by the hydraulic lines 50. The operation of the hydraulic cylinder 42 and, therefore, the extended position of the boom 40 may be controlled independently of the raising or lowering of the boom 40 as will appear more fully below. It may be noted that when the boom is in its fully extended position, it may be desirable to lock it in place by means of a transverse spring biased locking pin indicated generally at 52 which is adapted to be passed through receptive and aligned holes in the outer member 24 in extension 40 of the boom when it is fully extended.

Figure 7:
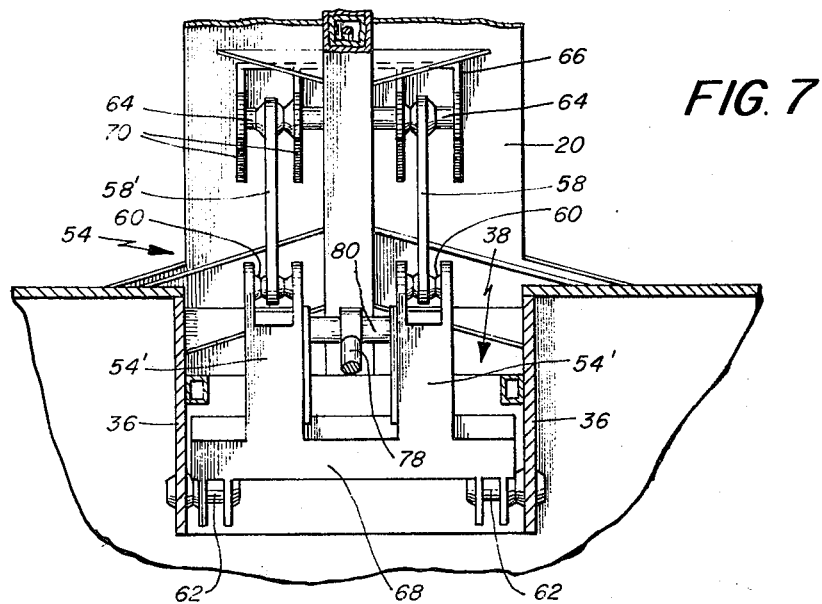
FIG. 7 is an illustration of the scissors jack arrangement as seen along the line 7—7 of FIG. 4.

The mechanism for raising and lowering the boom is shown in FIGS. 3-5 and 7 and includes a scissors jack arrangement 54 having a lower link section 56 and an upper link section 58, pivoted to each other at 60 as shown. The lower end of the lower link section is pivoted to the well-defining sections 36 of the frame at pivot 62 and the upper ends of the upper link section 58 are pivoted at 64 to a bracket 66 secured to and integral with the outer tubular member 24 of the boom 22. The lower link arrangement 56, as seen in FIG. 7, includes a transverse bar 68 which has a pair of lower links 54' extending therefrom. Each of the lower links 54' includes a clevis at its outer end which receives the pivots 60 and which in turn engage the upper links 58'. The bracket 66 includes a pair of arms 70 on each side of the boom 22 as shown to retain the pivots 64. The scissors jack arrangement 54 is operated by means of an hydraulic cylinder 72 which is pivoted, by means of the pivotable mounting bracket 74 to a pair of support members 76 secured to the frame portion 36. The ends of the mounting bracket 74 are pivoted to the support members 76 so that the piston rod 78 of cylinder 72 will extend substantially forwardly as shown. The forward end of the piston rod 78 is pivotally connected to the lower linkage arrangement 52 of the scissors jack at pivot 80 mounted between a pair of forwardly extending flange portions 82 of each of the lower links 54'. The hydraulic cylinder 72 may be operated and controlled by conventional valve arrangements to control the flow of hydraulic fluid to and from the cylinder 72 through appropriate hydraulic lines 84.

The foregoing arrangement is located in the truck with respect to the front and rear axles so that the weight of the vehicle being towed will be transmitted to the frame of the tow truck near its mid portion between the front and rear axles. This, of course, provides for substantially increased stability and permits the truck to lift and carry substantially heavier vehicles than with the previously proposed combination flatbed-tow truck types. As mentioned previously, the compromises required in the previously proposed trucks included boom raising structures which transmitted a substantial portion of the load from the towed vehicle to the frame of the truck so near or behind the rear axle so that the front wheels of the truck would tend to bear a relatively small portion of the total load. In this regard, it may be noted that while some of the load is transmitted to a point behind the axle, through the piston 78 of the hydraulic cylinder at the pivot 74, the downward component of this portion of the load is relatively small because the axis of the cylinder 72 is kept as near to the horizontal as practicable. FIGS. 3 and 4 show an attitude of the cylinder 72 which is found to be satisfactory and it can be seen that it makes an angle of less than 45° with the horizontal. The arrangement of the scissors jack 54 and hydraulic cylinder 72 is adapted to provide substantial mechanical advantage within the space limitations of the truck and well 38. In order to achieve sufficient stroke for the piston rod 78 to enable the scissors jack 54 to be operated to the maximum desirable raised position and to achieve compactness between the scissors jack arrangement and the rear end of the truck, the pivot 80 is located rearwardly of the pivot 60 by means of the flange 82. The location of the pivot 80 should be selected so that the pivot 80 is disposed between the angle made by the intersection of the lines extending through the pivots 64, 60 and 60, 62.

Figure 8:
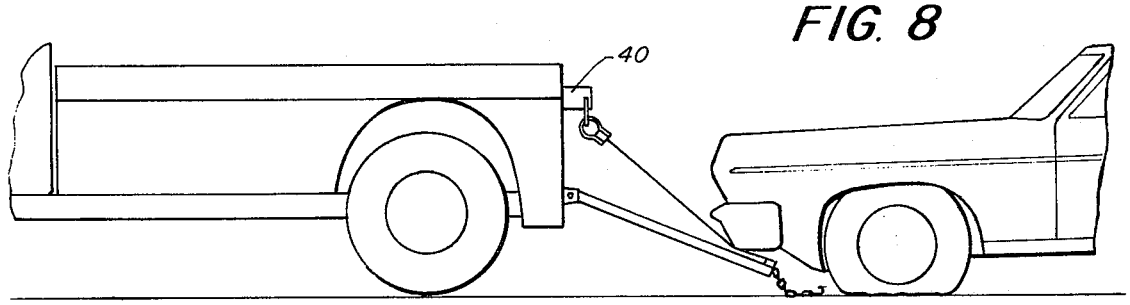
FIG. 8 is an illustration of the manner in which the truck can be employed to preliminarily raise the front end of a vehicle to facilitate access to the frame of a vehicle.
Figure 9:
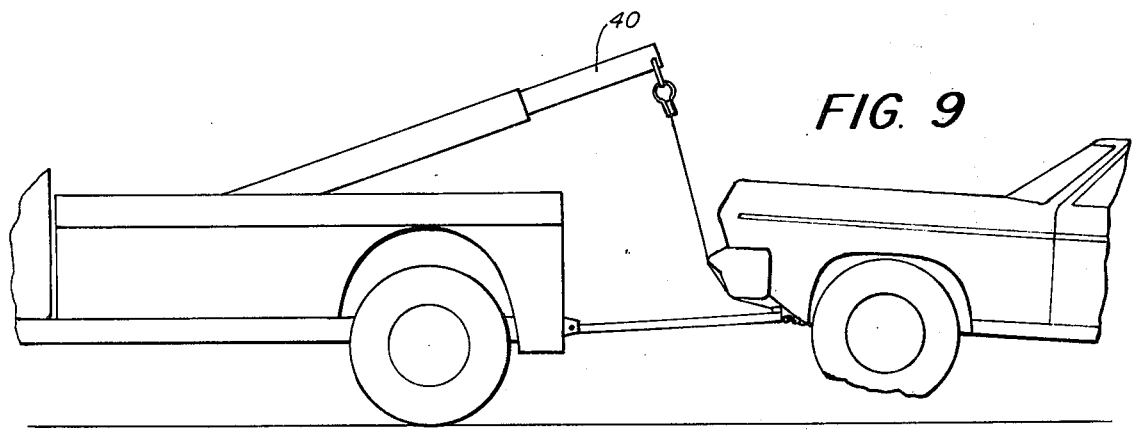
FIG. 9 is an illustration of a vehicle and the tow truck in the towing position.

A further aspect of the invention resides in the ability of the truck and boom to facilitate the attachment of the towing hooks to a vehicle which has its front end very close to the ground, as might be the case with a wrecked automobile or one with a very low suspension. The back of the truck includes a rear plate 86 (FIGS. 1–5) which has a cutout 88 at its upper edge in alignment with the extension 40 of the boom 22. The cutout 88 permits the extension 40 to be extended slightly rearwardly and outwardly through the cutout 88 (FIG. 8). With the boom in this position, the conventional towing arrangement itself may be used to raise the front end of the vehicle. The towing arrangement (FIGS. 8 and 9) includes the usual tow straps 90 secured at their upper and lower ends to cross bars 92, the arrangement being attached and suspended to the end of the extension 40 by means of the usual disconnectable fitting 94. The lower of the cross bars 92 is secured to the rearwardly converging ends of the tow bars 96 which are pivotally secured to the rear end of the truck at the pivot brackets 98. A pair of tow hooks 100 are connected by chains to the lateral ends of the lower cross bars 92. The tow hooks 100 are intended to be hooked to the vehicle frame, such as to the A-frames of the front suspension.

As mentioned above, one of the inherent difficulties which is encountered with both conventional tow trucks and combination trucks of the type described is that it is quite difficult and awkward to attach the tow hooks 100 to the A-frames of the vehicle when the front end of the vehicle is very near the ground. This results from the inability of the tow straps to wrap around sufficiently and engage the bumper of the vehicle to enable the hooks to reach the A-frame. In contrast, my invention restrains the upper end of the tow bar arrangement at the fitting 94. This enables the tow bar arrangement to act as a wedge when the tow truck is backed into the vehicle. As suggested in FIG. 8, my invention enables the straps 90 and tow bar to be driven below the bumper and to rigidify the straps to enable the operator to raise the front end of the vehicle slightly and permit rearward placement of the lower cross bar 92 so that the tow hooks 100 can be attached to the A-frames. The boom then can be raised and extended to the towing position shown in FIG. 9.

It should be understood that the foregoing description of the invention is intended merely to be illustrative thereof and that other modifications and embodiments may be apparent to those skilled in the art without departing from its spirit.

Having thus described the invention what I desire to claim and secure by Letters Patent is:

1. In a combination truck, the improvement comprising, in combination:
   a frame;
   a horizontal bed supported on the frame;
   the frame including means defining a longitudinally extending well below the bed;
   a boom disposed longitudinally in the truck and being pivoted at its forward end to the frame below the bed, the rearward end of the boom being adapted to be pivoted about the pivot between a lowered position within the well and a raised position;
   scissors jack linkage means mounted to the frame at a location between the pivot and the rearward location of the rear axle of the truck for raising and lowering the boom, the scissors jack linkage means being further constructed and arranged to receive a downwardly directed load applied to the boom and to direct the load to the frame along a direction which is forward of the rear axle of the truck;
   the scissors jack linkage means further comprising:
   upper linkage means pivoted at its upper end to said boom;
   lower linkage means pivoted at its lower end to said frame;
   the free ends of said upper and lower linkage means being pivoted to each other at a common pivot, said common pivot being disposed rearwardly of said upper pivots; and
   means mounted to the frame of the truck for operating said linkage means and comprising a hydraulic cylinder pivoted at its rearward end to the frame of the vehicle and having a substantially forwardly extending piston rod, said piston rod being pivoted to said lower linkage means at a location within the angle defined between said common pivot and said upper and lower pivots.

2. A truck as defined in claim 1 further comprising:
   said hydraulic cylinder and scissors jack arrangement being so constructed so that the axis of the hydraulic cylinder does not exceed an angle of 45° with the horizontal through its operating range.

3. A truck as defined in claim 1 further comprising:
   said boom being of telescopically extendible construction and including:
   a substantially tubular boom member pivoted at its forward end to the frame within the well;
   a slidable boom extension within said tubular member and being slidable axially and inwardly and outwardly thereof; and
   means mounted within said boom for effecting said movement of said boom extension.

4. A truck as defined in claim 3 wherein said means for effecting extension and retraction of the boom extension comprises:
   an hydraulic cylinder mounted within the forward end of the tubular boom member, said hydraulic cylinder having a rearwardly extending piston rod, said boom extension being hollowed to receive said piston rod; and
   means connecting the end of the piston rod to the extension member.

5. In a combination truck, the improvement comprising, in combination:
   a frame;
   a horizontal bed supported on the frame;
   said frame including means defining a longitudinally extending well below the bed;
   a boom disposed longitudinally in the truck and being pivoted at its forward end to the frame below the bed, the rearward end of the boom being adapted to be pivoted about the pivot between a lowered position within the well and a raised configuration;
   scissors jack linkage means mounted to the frame within the well and at a location between the pivot and the rearward location of the rear axle of the truck, said scissors jack linkage means being connected to said boom for raising and lowering said boom;
   said scissors jack linkage means being constructed and arranged to receive a downwardly directed load applied to said boom and to direct said load to said frame along a direction which is forward of the rear axle of said truck;

means mounted to the frame of the truck and being operatively connected to said scissors jack linkage means for raising and lowering the boom;

the scissors jack means comprising upper linkage means pivoted at its upper end to said boom and lower linkage means pivoted at its lower end to said frame, the free ends of said upper and lower linkage means being pivoted to each other at a common pivot, said common pivot being disposed rearwardly of said upper and lower pivots;

said means for operating said linkage means comprising an hydraulic cylinder pivoted at its rearward end to the frame of the truck and having a substantially forwardly extending piston rod, said piston rod being pivoted to said lower linkage means at a location within the angle defined between said common pivot and said upper and lower pivots;

said boom being of telescopically extendable construction and including a substantially tubular boom member pivoted at its forward end to the frame within the well, a slidable boom extension within the tubular member and being slidable axially and inwardly and outwardly thereof and means mounted within said boom for effecting said movement of said boom extension;

means at the rear lower end of the truck frame for attachment of a tow bar;

means enabling the boom extension to be extended outwardly and rearwardly slightly while the boom is in a substantially lowered position; and means enabling direct attachment of a tow strap arrangement to the rearwardly projecting end of the boom extension whereby the tow straps may be retained substantially firmly in a downwardly and rearwardly inclined attitude to enable the straps to act in wedge-like manner when the tow truck is backed up.

6. A truck as defined in claim 5 wherein the means enabling the boom to be extended rearwardly while in a substantially lowered position comprises:

said truck including a rear panel which enclose the rear end of said well, said panel having a cutout in alignment with the boom, when the boom is in a lowered position, said boom being extendible rearwardly through said cutout.

7. A truck as defined in claim 1 further comprising:

said bed including a portion covering said well, said portion being separable from the remaining portions of said bed and being secured to said boom for pivotal movement therewith.

8. A truck as defined in claim 1 further comprising: means defining an opening at the rear end of the well to enable the outer end of the boom to be extended beyond the rear end of the truck at least when the boom is lowered fully.

* * * * *